(12) United States Patent
Driscoll et al.

(10) Patent No.: US 10,444,551 B2
(45) Date of Patent: Oct. 15, 2019

(54) MULTI-WIDTH TRANSMISSION LINE

(71) Applicant: Intel Corporation, Santa Clara, CA (US)

(72) Inventors: Jeffrey B. Driscoll, San Jose, CA (US); Ling Liao, Fremont, CA (US); David Patel, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/231,217

(22) Filed: Dec. 21, 2018

(65) Prior Publication Data

US 2019/0146247 A1    May 16, 2019

(51) Int. Cl.
  *G02B 6/26* (2006.01)
  *G02F 1/025* (2006.01)
  *H01P 3/08* (2006.01)

(52) U.S. Cl.
  CPC ................ *G02F 1/025* (2013.01); *H01P 3/08* (2013.01)

(58) Field of Classification Search
  CPC ....... G02F 1/0147; G02F 1/025; B82Y 20/00; G02B 6/12007; G02B 6/26
  See application file for complete search history.

(56) References Cited

U.S. PATENT DOCUMENTS

| 7,024,057 | B2* | 4/2006 | Li ........................ B82Y 20/00 385/1 |
| 8,120,532 | B2* | 2/2012 | Rofougaran ............ H01Q 3/26 342/369 |

* cited by examiner

*Primary Examiner* — Jennifer Doan
(74) *Attorney, Agent, or Firm* — Patent Capital Group

(57) ABSTRACT

Embodiments may relate to a transmission line to be coupled with an electromagnetic waveguide. The transmission line may include a signal node with a first contact, a second contact, and a via between first contact and the second contact. The transmission line may further include a ground node with a third contact, a fourth contact, and a via between the third contact and the fourth contact. Other embodiments may be described or claimed.

20 Claims, 6 Drawing Sheets

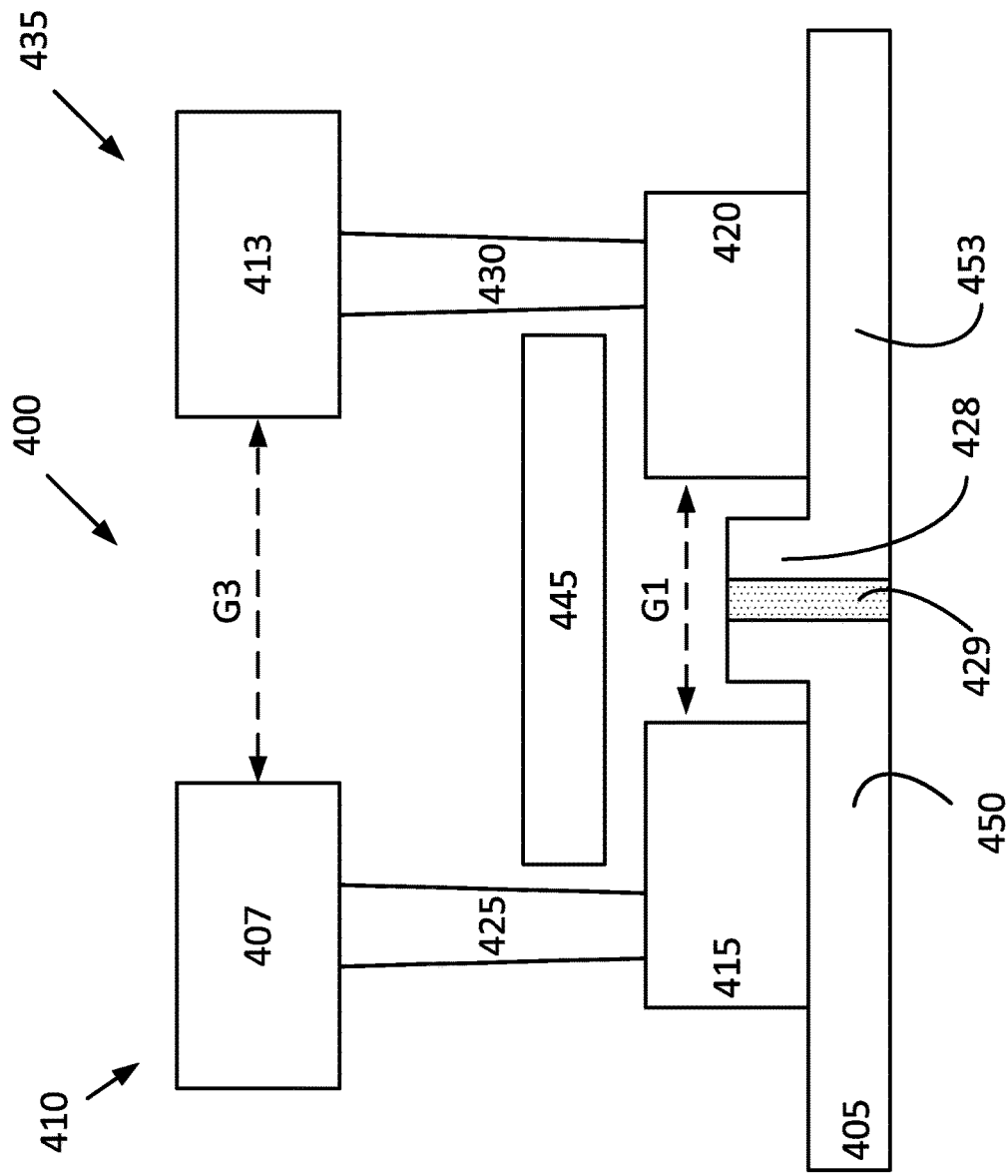

```
┌─────────────────────────────────────────┐
│ Depositing a first contact and a third  │
│ contact on a face of a substrate        │
│                 505                     │
└─────────────────────────────────────────┘
                    │
                    ▼
┌─────────────────────────────────────────┐
│ Coupling a first via to the first       │
│ contact and a second via to the third   │
│ contact                                 │
│                 510                     │
└─────────────────────────────────────────┘
                    │
                    ▼
┌─────────────────────────────────────────┐
│ Coupling a second contact to the first  │
│ via and a fourth contact to the second  │
│ via                                     │
│                 515                     │
└─────────────────────────────────────────┘
                    │
                    ▼
┌─────────────────────────────────────────┐
│ Communicatively coupling the second     │
│ contact to a signal source              │
│                 520                     │
└─────────────────────────────────────────┘
                    │
                    ▼
┌─────────────────────────────────────────┐
│ Communicatively coupling the fourth     │
│ contact to a ground                     │
│                 525                     │
└─────────────────────────────────────────┘
```

Figure 5

MULTI-WIDTH TRANSMISSION LINE

BACKGROUND

Transmission line optimization for targeting impedance or group index performance, such as for traveling wave modulator applications, may require tuning of the signal width and signal-to-ground gap for legacy transmission line designs. This tuning may simultaneously impact a variety of parameters such as the access resistance to a load, transmission line inductance, transmission line capacitance, etc. Often, fine control of transmission line parameters may be required for a high-performance traveling wave device. However, this fine control may present a challenge given the complex coupling between key parameters and physical geometric parameters that may exist in legacy designs.

Additionally, when driving an un-terminated lumped-element component (such as may be the use case for a ring modulator), access resistance to the load may be considered a critical parameter as related to component response time due to the resistance/capacitance (RC) time constant of the system. Often, there may be geometrical constraints that limit the proximity of the physical contact to the load, which in turn may impact access resistance of the transmission line. Often, bias point control may be realized with a heater that is used to tune the optical phase-offset of the transmission line. The inclusion of the heater may create size-limitations in the transmission line in order to optimize heater efficiency and resistance.

BRIEF DESCRIPTION OF THE DRAWINGS

FIG. 4 depicts an alternative example cross-section of a multi-width transmission line, in accordance with embodiments herein.

FIG. 5 depicts an example technique for constructing a multi-width transmission line, in accordance with embodiments herein.

DETAILED DESCRIPTION

Figure 1:
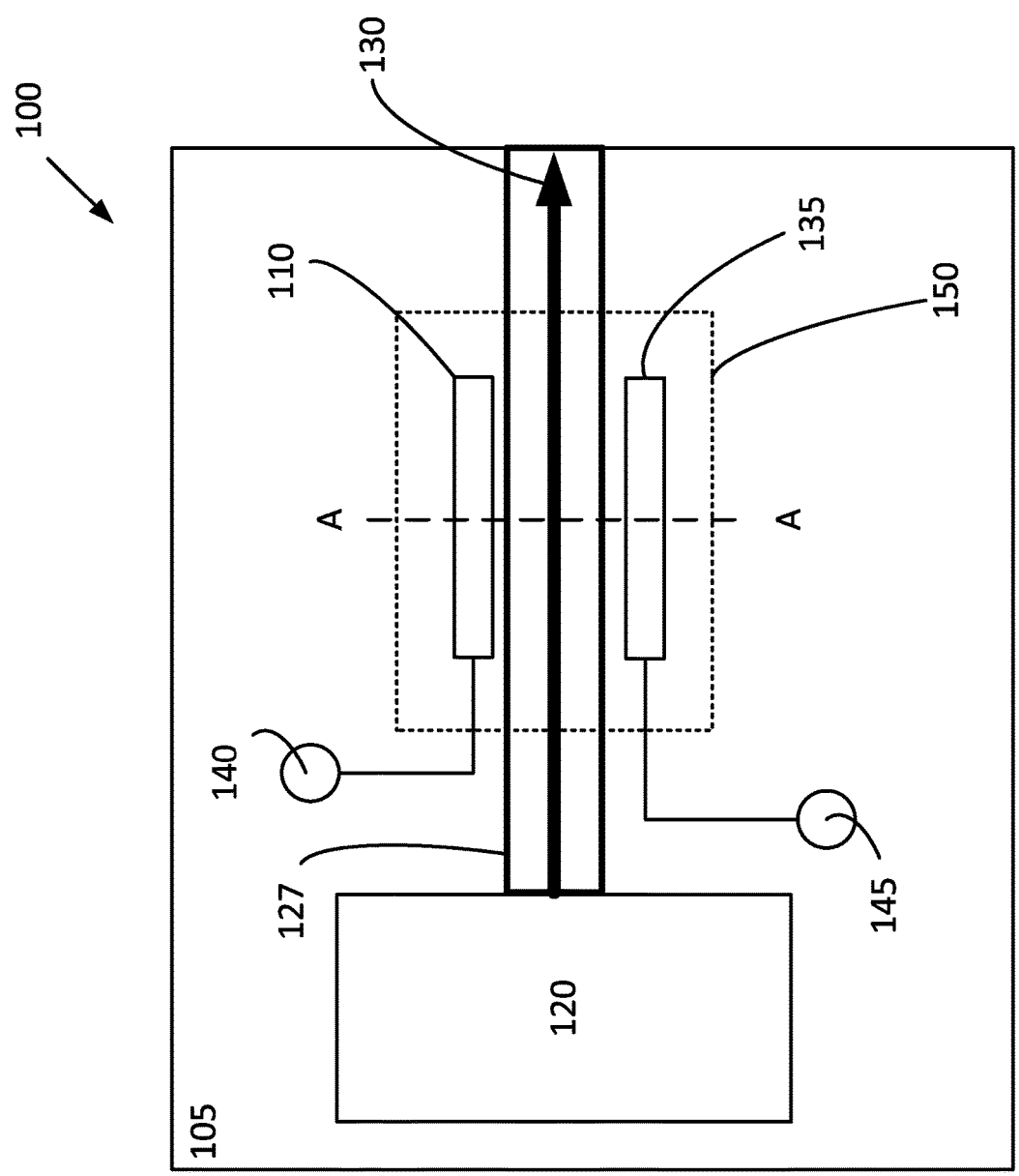
FIG. 1 depicts an example of an electromagnetic transmitter with a transmission line, in accordance with various embodiments herein.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature formed, deposited, or otherwise disposed on a second feature," may mean that the first feature is formed, deposited, or disposed over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise. Additionally, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined, e.g., using scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

As noted above, legacy designs may present difficulties in fine-tuning one or more transmission line parameters. Embodiments herein may relate to a multi-width transmission line which may enable increased degrees of freedom for fine-tuning transmission line performance. The consequences of the multi-width structure may be that key parameters such as group index and impedance may become generally decoupled from one another, allowing for individual control through separate geometric parameters.

More specifically, the multi-width design of the transmission line may allow for the engineering of precise transmission line characteristics for high baud-rate traveling wave modulators within silicon photonic transmitters. The multi-width design may also enable low-resistance/high-performance lumped-element modulators—for example, ring modulators—even when integration with metallic heaters may dictate relatively large transmission line gaps.

FIG. 1 depicts an example of an electromagnetic transmitter 100, in accordance with embodiments herein. The electromagnetic transmitter 100 may include a substrate 105. The substrate 105 may include, for example, silicon or some other type of organic or inorganic substrate. The electromagnetic transmitter 100 may also include a wave source 120. The wave source 120 may be, for example, a laser if the electromagnetic transmitter 100 is to carry a photonic wave. In other embodiments, the wave source 120 may be some other type of wave source that is designed to generate an electromagnetic wave in the millimeter wave (mmWave) range, the radio frequency (RF) range, or some other type of electromagnetic wave. The electromagnetic transmitter 100 may further include a waveguide 127 that is configured to carry the electromagnetic wave 130 therein. For example, as shown with respect to the orientation of FIG. 1, the waveguide 127 may carry the electromagnetic wave 130 towards the right of the Figure.

Generally, it may be desirable to encode information into the electromagnetic wave. The wave itself, when it is produced by the wave source 120, may not carry information. However, the electromagnetic transmitter 100 may include one or more modulators such as modulator 150. Generally, in operation, the modulator 150 may be configured to encode data onto the electromagnetic wave 130 as the electromagnetic wave 130 propagates through the waveguide 127. As depicted in FIG. 1, the modulator 150 may be referred to as a traveling wave modulator. The modulator 150 may have a signal node 110 and a ground node 135. The signal node 110 may be electrically coupled to a signal source 140, and the ground node 135 may be electrically coupled to ground 145. Generally, the signal node 110 and the ground node 135 may together be referred to as a "transmission line." In some embodiments, the signal node 110 may also be referred to as a signal electrode and, similarly, the ground node 135 may be referred to as a ground electrode.

In operation, signal node 110 and the ground node 135 may form a p-n junction with the waveguide 127 generally positioned therebetween. As the voltages of the signal node 110 fluctuate, the transmission characteristics of the waveguide 127 may fluctuate. This fluctuation may result in the encoding of data onto the electromagnetic wave 130. The signal source 140 may provide the fluctuating voltage to the signal node 110. Specifically, as the transmission line is loaded by the changing voltage from the signal source 140, the p-n junction in the substrate 105 or waveguide 127 may undergo a phase change, which may impart the electrical data from the signal source 140 into the electromagnetic wave 130.

It will be understood that FIG. 1 is a highly simplified example Figure, and in other embodiments the electromagnetic transmitter 100 may be more complicated, or may not have certain elements in the arrangement depicted in FIG. 1. For example, in some embodiments the modulator 150 may be configured as a Mach-Zehnder interferometer, and may include two separate waveguides 127 coupled with the wave source 120. In some embodiments, certain depicted elements may not be coupled with the substrate. For example, in embodiments the wave source 120, the signal source 140, the ground 145, etc. may not be physically coupled with the substrate 105, or they may not be considered elements of the electromagnetic transmitter 100. Rather, for example, the wave source 120 may be separate from the substrate 105 but still electromagnetically coupled with the waveguide 127. In some embodiments, the electromagnetic transmitter 100 may include more than one modulator such as modulator 150, and respective ones of the modulators may be longer or shorter (with respect to the waveguide 127) than depicted in FIG. 1.

Figure 2:
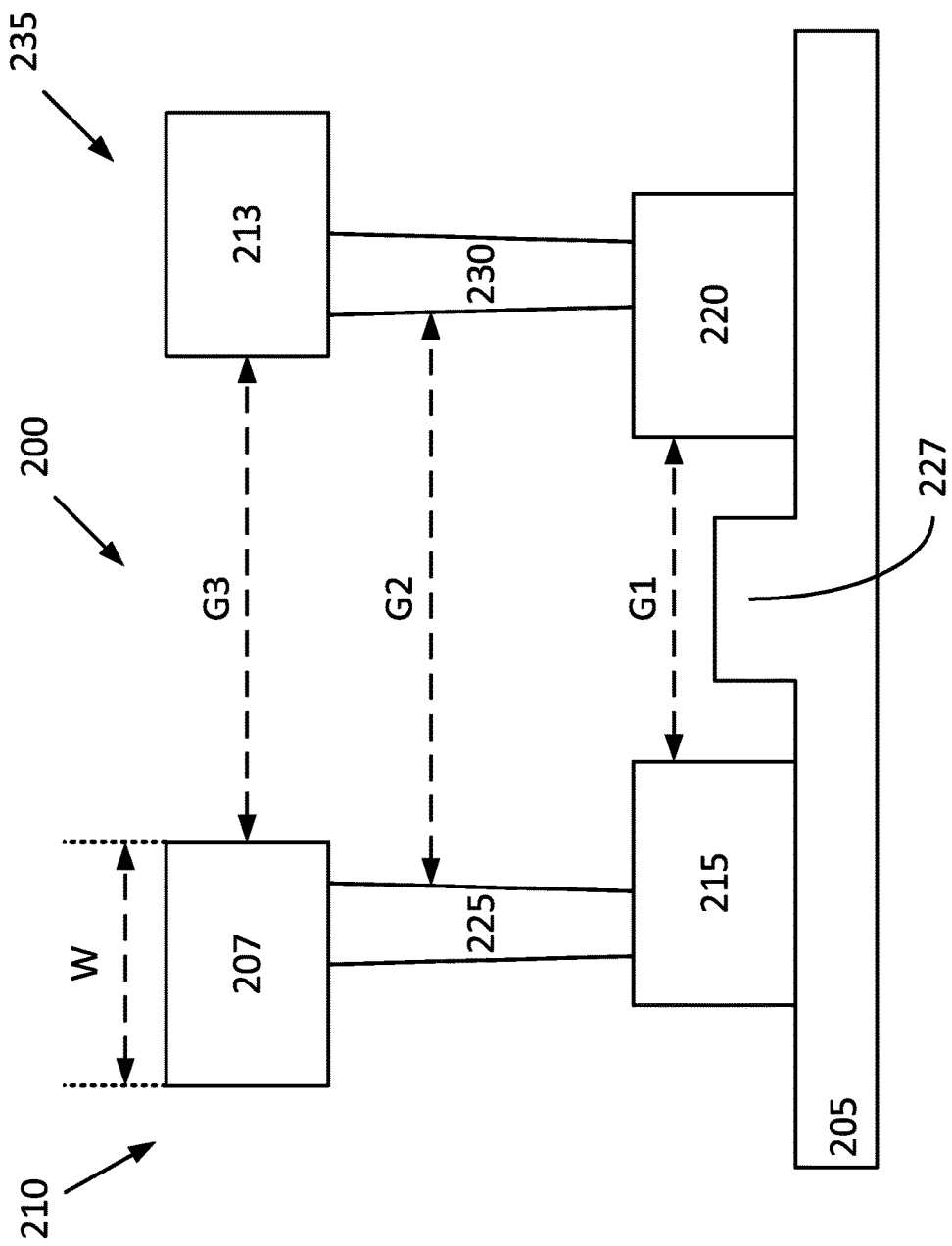
FIGS. 2 depicts an example cross-section of a multi-width transmission line, in accordance with embodiments herein.

FIG. 2 depicts an example transmission line 200. Specifically, FIG. 2 depicts a highly simplified cross-sectional view of the transmission line 200 taken along line A-A of FIG. 1. The transmission line may include a source node 210 and a ground node 235, which may be respectively similar to source node 110 and ground node 135. The source node 210 may include a top contact 207, a bottom contact 215, and a via 225 that couples the contacts 207 and 215. Similarly, the ground node 235 may include a top contact 213, a bottom contact 220, and a via 230 that couples the contacts 213 and 220. In some embodiments, the via 225 may be directly coupled with one or both of contacts 207 and 215, while in other embodiments an intermediate adhesive or structure such as a copper pad, solder, etc. may be positioned between the via 225 and one or both of contacts 207 and 215. Similarly, via 230 may be either directly coupled with one or both of contacts 213 and 220, or an intermediate adhesive or structure may be positioned between the via 230 and one or both of contacts 213 and 220.

In various embodiments, the vias 225 or 230 may be plated vias that include, at least wholly or partially, a conductive material such as copper. The vias 225 or 230 may allow electrical communication between, e.g., contacts 207 and 215, or contacts 213 and 220. Generally, the vias 225 or 230 may be drilled, chemically etched, or formed in some manner. Although the vias 225 and 230 are depicted as having generally sloped sides that narrow as the vias 225/230 approach contacts 215/220, in other embodiments one or both of the vias 225 and 230 may have relatively straight sides, curved sides, sides that widen as they approach closer to contacts 215/220, or some other cross-section. Similarly, one or more of the contacts 207/213/215/220 may have a cross-sectional shape that is different than that shown in FIG. 2. For example, one or more of the contacts 207/213/215/220 may have one or more rounded edges, may have one or more sloped edges, etc. The contacts 207/213/215/220 may be plated onto the structure on which they are positioned, may be pre-formed and then placed on the structure, may be laminated, or may be positioned in some other manner.

In some embodiments, the transmission line 200 may be coupled with a substrate 205 that has a waveguide 227, which may be respectively similar to substrate 105 and waveguide 127. More specifically, contacts 215 and 220 may be coupled with the substrate 205. In embodiments, one or both of contacts 215 and 220 may be coupled directly with the substrate 205, while in other embodiments an intervening structure such as an adhesive, a socket, solder, etc. may be positioned between the substrate 205 and one or both of contacts 215/220.

In the embodiment of FIG. 2, an electromagnetic wave—which may be similar to electromagnetic wave 130—may propagate through waveguide 227 in a direction into or out of the page as oriented in FIG. 2. In various embodiments, the substrate 205 and/or the waveguide 227 may be formed of a material such as silicon or a material that includes silicon. In some embodiments one or both of the waveguide 227 and the substrate 205 may include one or more dopants. In some embodiments the waveguide 227 and the substrate 205 may be a unitary piece of material, while in other embodiments the waveguide 227 and the substrate 205 may be formed of different types of materials, either as two pre-formed structures that are then adhered together or by implantation of a dopant subsequent to formation of the waveguide 227 and the substrate 205. It will be understood that although the waveguide 227 is depicted as being relatively rectangular and well-defined, in other embodiments the waveguide 227 may have one or more sloped, curved, or rounded sides or corners.

As can be seen in FIG. 2, various portions of the transmission line 200 may have different distances from one another. For example, contacts 215 and 220 may be spaced apart from each other at a first distance G1. The vias 225 and 230 may be spaced apart from one another by a second distance G2. Contacts 207 and 213 may be spaced apart from one another by a third distance G3. Generally, G1 may be on the order of between a few micrometers (microns) and tens of microns. For example, in some embodiments G1 may be between approximately 4.4 microns and approximately 20 microns. In some embodiments, G3 may be on the order of between tens of microns and hundreds of microns. For example, in some embodiments, G3 may be between approximately 10 microns and approximately 100 microns.

In various embodiments contact 207, which may be considered a contact of the signal node 210, may have a width W. In legacy designs, the gap between the signal line and the ground line of the transmission line, as well as the width of the contact of the signal line, would have been the primary design parameters for engineering key features such as transmission line impedance, group index, and bandwidth of the transmission line.

More generally, in the case of driving a transmission line, often an impedance target may exist due to the characteristic impedance of the system that the transmission line is connected to. For example, if a 30 ohm output impedance transmission line driver is selected, a transmission line impedance close to 30 ohms may be desired for minimizing back-reflections within the system. Additionally, the group index of the transmission line may be considered an important design parameter in optical modulators to maximize optical bandwidth, because walk-off between the electrical mode and the optical mode of modulator may manifest itself as a bandwidth penalty. Therefore, most common applications may require targeting both the impedance and the group index parameters.

However, as discussed above legacy structures may have presented significant difficulties in trying to fine-tune each of those parameters because an alteration in the structure to affect one parameter would have resulted in a drastic change in another parameter. However, the structure depicted in FIG. 2, wherein each of the nodes 210 and 235 include two contacts, may present significant advantages because the various parameters of the transmission line may be decoupled and so one parameter may be alterable without significantly altering another of the parameters. More specifically, altering the distance G3 may alter one parameter of the transmission line (e.g., group index) without significantly affecting other parameters, while altering the distance G1 may alter another parameter of the transmission line (e.g. impedance) without significantly affecting other parameters. In some cases, altering G3 may at least partially alter impedance, or altering G1 may at least partially alter group index, but those alterations may be relatively low compared to the alterations of group index as a result of changing G3 or the alterations of impedance as a result of changing G1.

Generally, the distance G1 and G3 may be selected to fine-tune the parameters based on baseline parameters that result from selection of the width W. The width W may be based on, for example, design considerations, space considerations, or use cases of the transmission line. Similarly, the distance G2 may alter one or more parameters of the transmission line, and may be similarly selected to further fine-tune the transmission line. In other embodiments, the distance G2 may be selected and one or more of the distances G1 and G3 may be altered as a result. Advantageously, even though the various parameters may be altered based on a number of design structures or the distances W, G1, G2, or G3, the decoupling of the parameters based on the dual-contact structure of each of the nodes 210 and 235 may allow for fine-tuning of one of the parameters without significantly affecting others of the parameters as described above. For example, altering the distance G1 may allow the impedance of the transmission line to be set to within approximately +/−5 ohms of a desired target.

Figure 3:
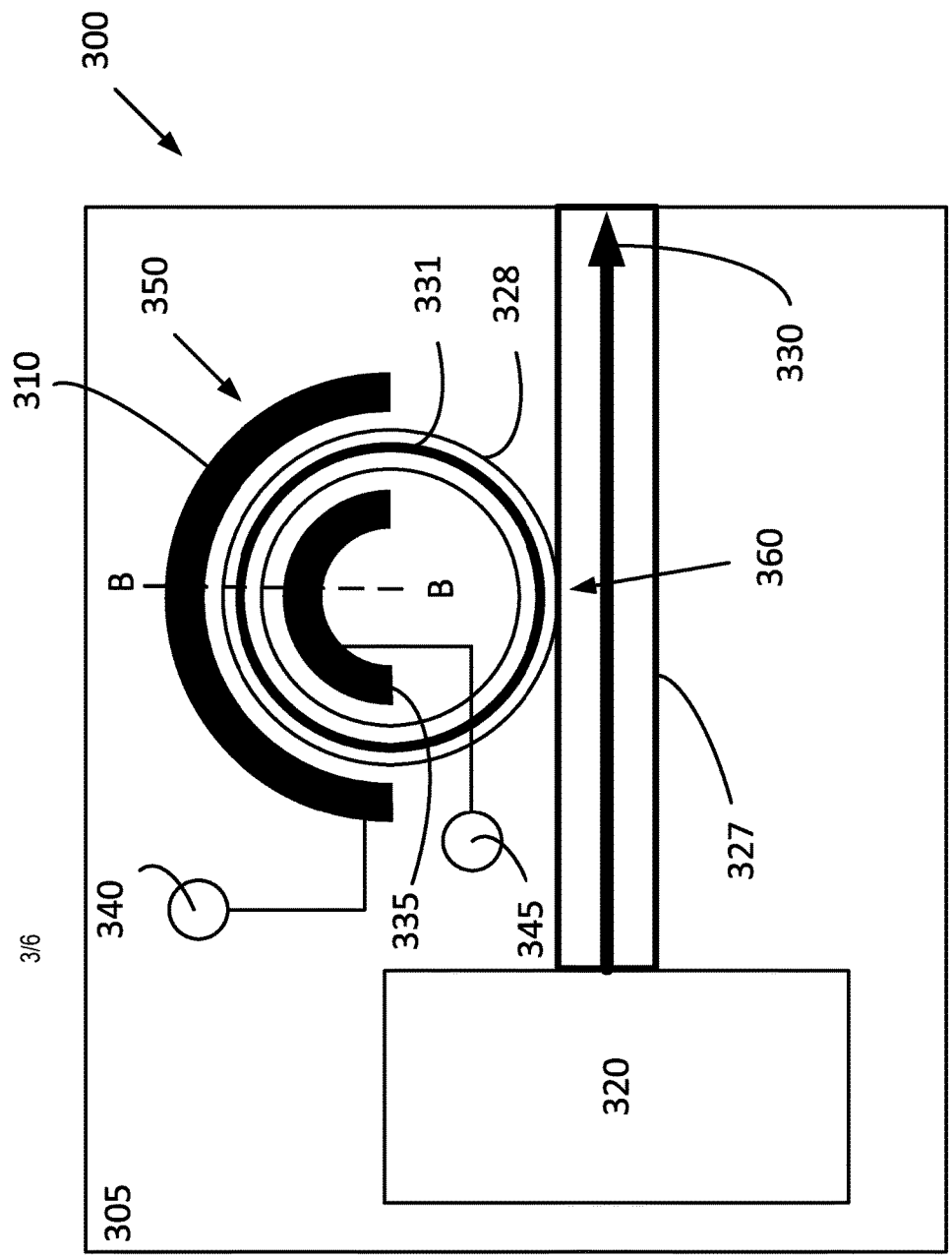
FIG. 3 depicts an alternative example of an electromagnetic transmitter with a transmission line, in accordance with various embodiments herein.

FIG. 3 depicts an alternative example an electromagnetic transmitter 300 with a transmission line, in accordance with various embodiments herein. Generally, the electromagnetic transmitter 300 may be similar to electromagnetic transmitter 100, and include similarly numbered elements. For example, the electromagnetic transmitter 300 may include a substrate 305, a wave source 320, and a waveguide 327 configured to transmit an electromagnetic wave 330, which may be respectively similar to substrate 105, wave source 120, waveguide 127, and electromagnetic wave 130.

The waveguide 327 may be electromagnetically coupled with a modulator 350. In the embodiment of FIG. 3, the modulator 350 may be considered to be a ring modulator. Similarly to modulator 150, the modulator 350 may include a signal node 310 coupled with a signal source 340, and a ground node 335 coupled with a ground 345, which may be respectively similar to signal node 110, signal source 140, ground node 135, and ground 145. However, as can be seen in FIG. 3, the modulator 350 may not directly modulate the electromagnetic wave 330 as it propagates through waveguide 327. Rather, the modulator 350 may itself have a waveguide 328 with an electromagnetic wave 331 propagating therein. Generally, the waveguide 328 may be similar to waveguide 327, and the electromagnetic wave 331 may be similar to electromagnetic wave 330.

The modulator 350, and particularly the waveguide 328 of the modulator 350, may be electromagnetically coupled with waveguide 327 at junction 360. As electromagnetic wave 330 propagates through waveguide 327, the electromagnetic wave 330 may divert into the waveguide 328 and form electromagnetic wave 331. As the electromagnetic wave 331 propagates through the waveguide 328, it may constructively or destructively interfere either with itself or with wave 330. The nodes 310 and 335 may control that propagation and interference and, as a result, the electromagnetic wave 330 may be modulated to include information based on the signals input by the signal source 340 to the signal node 310.

It will be understood that FIG. 3 is a highly simplified example Figure, and in other embodiments the electromagnetic transmitter 300 may be more complicated, or may not have certain elements in the arrangement depicted in FIG. 3. For example, in some embodiments the modulator 350 may include more or fewer nodes 310/335 than depicted in FIG.

3, or the nodes 310/335 may be longer or shorter than depicted in FIG. 3. Additionally, in some embodiments the ground node 335 may be on the exterior of the ring modulator (e.g., where signal node 310 is depicted), and signal node 310 may be on the interior of the ring modulator 350 (e.g., wherein ground node 335 is depicted). In some embodiments, the modulator 350 may be spaced further from, or closer to, the waveguide 327, such that there is a gap between the waveguides 327 and 328, or the waveguides 327/328 overlap. In some embodiments, certain elements such as the wave source 320, the signal source 340, or the ground 345 may not be elements of the electromagnetic transmitter 300, but rather may be electromagnetically or communicatively coupled with various elements of the electromagnetic transmitter 300 such as the nodes 310/335 or the waveguide 327. Additionally, as will be discussed in greater detail below, the modulator 350 may include a heater, which is not depicted in FIG. 3 for the sake of clarity of the Figure.

FIG. 4 depicts an example transmission line 400. Specifically, FIG. 4 depicts a highly simplified cross-sectional view of the transmission line 400 taken along line B-B of FIG. 3. FIG. 4 may include elements similar to those of FIG. 2 or 3 discussed above. Specifically, FIG. 4 may depict a transmission line 400 coupled with a substrate 405 that includes a waveguide 428, which may be similar to substrate 305 and waveguide 328. The transmission line 400 may further include a source node 410 and a ground node 435, which may be respectively similar to source node 310 and ground node 335. The source node 410 may include a top contact 407, a bottom contact 415, and a via 425 which may be similar to top contact 207, bottom contact 215, and via 225. Similarly, the ground node 435 may include a top contact 413, a bottom contact 420, and a via 430, which may be respectively similar to top contact 213, bottom contact 220, and via 230. Similarly to transmission line 200, the bottom contacts 415 and 420 may be separated by a distance G1, which may be similar to distance G1 of FIG. 2. The top contacts 407 and 413 may be separated by a distance G3, which may be similar to distance G3 of FIG. 2. Additionally, as shown in FIG. 4, the transmission line 400 may include a heater 445 which may be used to tune the optical phase-offset of the transmission line 400.

When using a ring modulator such as modulator 350, it may be desirable to optimize access resistance of the device. Generally, a ring modulator may be engineered to have a relatively low capacitance. As an example, if the series resistance of the ring modulator is on the order of approximately 30 ohms, then the series capacitance of the modulator may be approximately 40 femtofarads (fF). In this case, the RC bandwidth of the transmission line using the modulator may be on the order of approximately 130 gigahertz (GHz). However, it may be desirable to include a heater such as heater 445 in the transmission line 400 to compensate for fabrication imperfection as well as to tune the operating bias point of the transmission line 400 over various temperature and environmental conditions. One technique for including a heater, as shown in FIG. 4, is to include the heater 445 over the waveguide 428. Generally, the heater 445 may be a resistive metal such as titanium or titanium nitride.

Generally, as noted above, the signal node 410 and the ground node 435 may form a p-n junction with the waveguide 428 generally positioned therebetween. In FIG. 4, portion 450 of the substrate 405 may be considered the "p" portion, and portion 453 of the substrate 405 may be considered the "n" portion. As the voltages of the signal node 410 fluctuate, the transmission characteristics of the waveguide 428 may fluctuate. Specifically, the waveguide 428 and the substrate 405 may include a depletion region 429. As the voltages of the signal node 410 fluctuate, the width of the depletion region 429 may change (e.g., change the length of the depletion region as measured in a direction parallel to the face of the substrate 405 to which the contacts 415/420 are coupled). The changing width of the depletion region 429 may cause a phase shift in the optical mode of the waveguide 428 through free-carrier-dispersion, and this phase shift may result in the encoding of data onto the electromagnetic wave propagating through the waveguide 428.

As can be seen in FIG. 4, the heater 445 may have a width which may have negatively impacted series resistance of the transmission line. However, in transmission line 400, the heater 445 may affect the distance G3 of the top contacts 407 and 413. However, the series resistance of the transmission line 400 may be based on the distance G1 between the bottom contacts 415 and 420. In other words, the series resistance may be tuned based on the bottom contacts 415 and 420 regardless of the inclusion of the heater 445. As a result, the transmission line 400 may maintain a relatively constant RC bandwidth, thereby allowing for high modulation performance to be maintained while independently optimizing the heater design (which may affect distance G3).

FIG. 5 depicts an example technique for constructing a multi-width transmission line such as transmission lines 200 or 400, in accordance with embodiments herein. Generally, the technique may be described with respect to elements of transmission line 200, however it will be understood that the technique may apply to elements of FIG. 4 with some or no modification.

The technique may include depositing, at 505, a first contact and a third contact on a face of a substrate. The contacts may be, for example, contacts 215 and 220, and the substrate may be substrate 205. The technique may then include coupling, at 510, a first via to the first contact and a second via to the third contact. The vias may be, for example, vias 225 and 230. The technique may further include coupling, at 515, a second contact to the first via and a fourth contact to the second via. The second contact may be, for example, contact 207 and the fourth contact may be, for example, contact 213.

As previously noted, via 225 and contacts 207/215 may make up a source node 210, which may be generally similar to source node 110. Additionally, via 230 and contacts 213/220 may make up a ground node 235, which may be generally similar to ground node 135. In this embodiment, the technique may further include communicatively coupling, at 520, the second contact to a signal source such as signal source 140. The technique may further include coupling, at 525, the fourth contact to a ground such as ground 145.

It will be understood that this described technique is highly simplified. Further, in some embodiments certain of the elements (e.g., elements 520 and 525) may be performed in a different order, or concurrently with one another. In some embodiment, certain elements such as elements 520 and 525 may not be present, or additional elements may be present. Other variations may be present in other embodiments.

Figure 6:
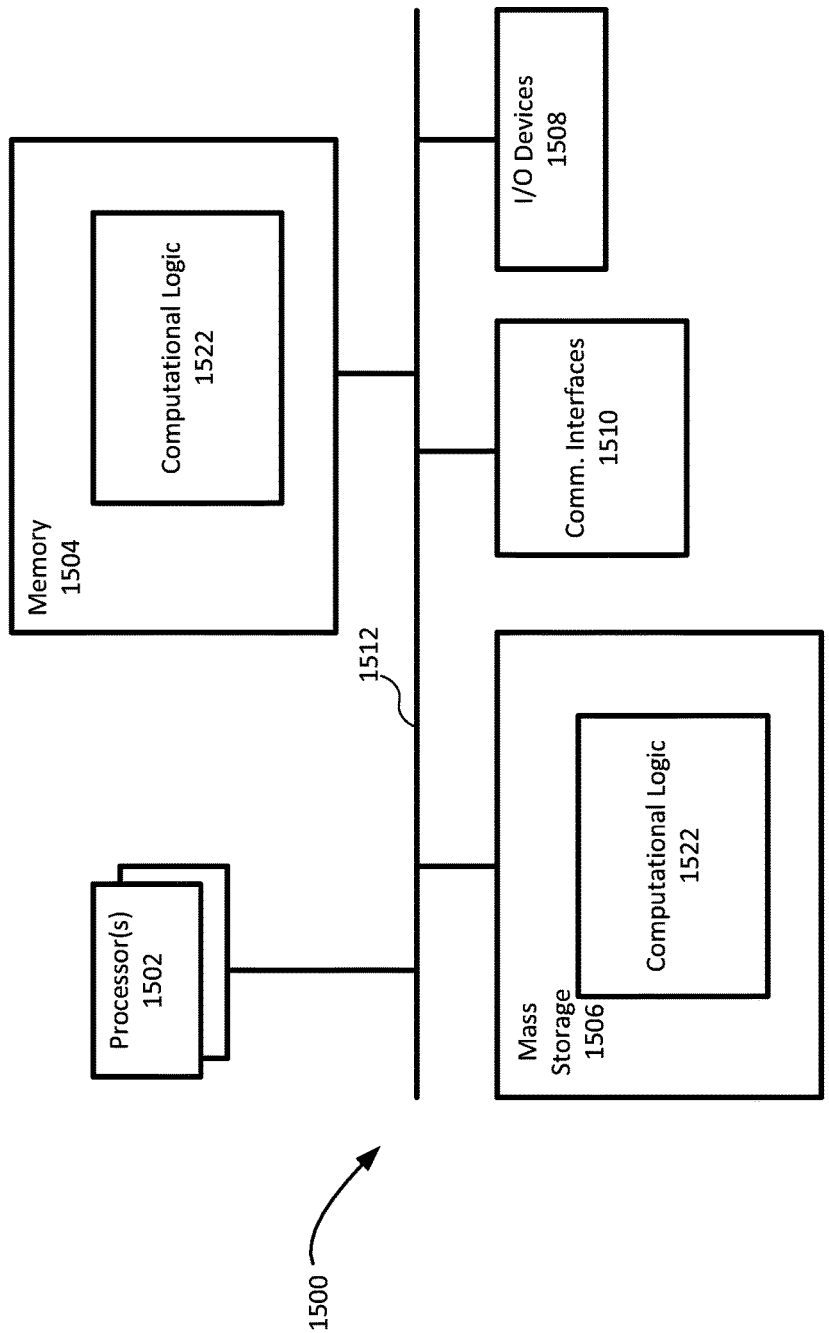
FIG. 6 illustrates an example device that may use various embodiments herein, in accordance with various embodiments.

FIG. 6 illustrates an example computing device 1500 suitable for use with electromagnetic transmitters 100 or 300, in accordance with various embodiments. Specifically, in some embodiments, the computing device 1500, or components thereof, may include one or more of packages electromagnetic transmitters 100 or 300 therein.

As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a CPU, a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., DRAM, compact disc read-only memory (CD-ROM), digital versatile disk (DVD), and so forth)). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or DRAM. Non-volatile memory may include, but is not limited to, electrically erasable programmable read-only memory, phase change memory, resistive memory, and so forth. In some embodiments, one or both of the system memory 1504 or the mass storage device 1506 may include computational logic 1522, which may be configured to implement or perform, in whole or in part, one or more instructions that may be stored in the system memory 1504 or the mass storage device 1506. In other embodiments, the computational logic 1522 may be configured to perform a memory-related command such as a read or write command on the system memory 1504 or the mass storage device 1506.

The computing device 1500 may further include input/output (I/O) devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth).

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The computing device 1500 may further include or be coupled with a power supply. The power supply may, for example, be a power supply that is internal to the computing device 1500 such as a battery. In other embodiments the power supply may be external to the computing device 1500. For example, the power supply may be an electrical source such as an electrical outlet, an external battery, or some other type of power supply. The power supply may be, for example alternating current (AC), direct current (DC) or some other type of power supply. The power supply may in some embodiments include one or more additional components such as an AC to DC convertor, one or more downconverters, one or more upconverters, transistors, resistors, capacitors, etc. that may be used, for example, to tune or alter the current or voltage of the power supply from one level to another level. In some embodiments the power supply may be configured to provide power to the computing device 1500 or one or more discrete components of the computing device 1500 such as the processor(s) 1502, mass storage 1506, I/O devices 1508, etc.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

As noted above, the computing device 1500, or one or more components thereof such as the communication interface 1510, processor 1502, etc. may include an electromagnetic transmitter such as electromagnetic transmitters 100 or 300. In embodiments, the electromagnetic transmitters 100 or 300 may allow the components to communicate with one another via system bus 1512. Additionally or alternatively, the electromagnetic transmitters 100 or 300 may allow various of the components to communicate with one or more components of another device.

EXAMPLES OF VARIOUS EMBODIMENTS

Example 1 includes a transmission line to be coupled with an electromagnetic waveguide, wherein the transmission line comprises: a signal node that includes a first contact, a second contact, and a first via that communicatively couples the first contact and the second contact; and a ground node that includes a third contact, a fourth contact, and a second via that communicatively couples the third contact and the fourth contact; wherein a first distance between the first contact and the third contact, as measured in a first direction perpendicular to a direction of signal propagation through the waveguide, is based on a desired group index of the transmission line; and wherein a second distance between the second contact and the fourth contact, as measured in the first direction, is based on a desired impedance of the transmission line.

Example 2 includes the transmission line of example 1, wherein the first contact and the third contact are to be coupled with a face of a substrate that includes the waveguide.

Example 3 includes the transmission line of example 2, wherein the second contact is at least partially positioned over the first contact in a direction perpendicular to the face of the substrate.

Example 4 includes the transmission line of example 3, further comprising a heater to tune operating bias of the transmission line, wherein the heater is at least partially positioned between the first contact and the second contact.

Example 5 includes the transmission line of example 2, wherein the fourth contact is at least partially positioned over the third contact in the direction perpendicular to the face of the substrate.

Example 6 includes the transmission line of any of examples 1-5, wherein altering the first distance alters the group index of the transmission line to a greater degree than it alters the impedance of the transmission line.

Example 7 includes the transmission line of any of examples 1-5, wherein altering the second distance alters the impedance of the transmission line to a greater degree than it alters the group index of the transmission line.

Example 8 includes the transmission line of any of examples 1-5, wherein the transmission line is a transmission line of a traveling wave modulator or a ring modulator.

Example 9 includes a method of forming a modulator that includes an electromagnetic transmission line, the method comprising: depositing a first contact and a third contact on a face of a substrate, wherein the first contact is a first distance away from the third contact as measured in a first direction parallel to the face of the substrate, and wherein the substrate includes a waveguide that is to transmit an electromagnetic signal in a second direction parallel to the face of the substrate and perpendicular to the first direction; coupling a first via to the first contact and a second via to the third contact, wherein the first via and the second via extend in a third direction perpendicular to the face of the substrate; coupling a second contact to the first via and a fourth contact to the second via, wherein the second contact is a second distance away from the fourth contact as measured in the first direction; communicatively coupling the second contact to a signal source; and communicatively coupling the fourth contact to a ground.

Example 10 includes the method of example 9, wherein the first distance is based on a desired group index of the transmission line.

Example 11 includes the method of example 9, wherein the second distance is based on a desired impedance of the transmission line.

Example 12 includes the method of any of examples 9-11, wherein the substrate is a silicon substrate.

Example 13 includes the method of any of examples 9-11, further comprising positioning a heater between the first via and the second via, wherein the heater at least partially overlaps the first contact and the third contact as measured in the direction perpendicular to the face of the substrate.

Example 14 includes the method of any of examples 9-11, wherein the second contact at least partially overlaps the first contact in the direction perpendicular to the face of the substrate.

Example 15 includes an electromagnetic modulator that includes: a substrate with a waveguide; and a transmission line physically coupled with a face of the substrate and electromagnetically coupled with the waveguide, wherein the transmission line includes: a signal node coupled with a signal source, wherein the signal node includes a first contact coupled with the substrate, a second contact positioned at least partially over the first contact in a direction perpendicular to the face of the substrate, and a first via that couples the first contact to the second contact; and a ground node coupled with a ground, wherein the ground node includes a third contact coupled with the substrate, a fourth contact positioned at least partially over the third contact in the direction perpendicular to the face of the substrate, and a second via that couples the third contact to the fourth contact.

Example 16 includes the electromagnetic modulator of example 15, wherein the substrate is a silicon substrate.

Example 17 includes the electromagnetic modulator of examples 15 or 16, wherein the waveguide extends in a first direction parallel to the face of the substrate.

Example 18 includes the electromagnetic modulator of example 17, wherein the first contact is a first distance away from the third contact as measured in a second direction parallel to the face of the substrate and perpendicular to the first direction; and wherein the second contact is a second distance away from the fourth contact as measured in the second direction.

Example 19 includes the electromagnetic modulator of example 18, wherein the first distance is based on a desired group index of the transmission line.

Example 20 includes the electromagnetic modulator of example 18, wherein the second distance is based on a desired impedance of the transmission line.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A transmission line to be coupled with an electromagnetic waveguide, wherein the transmission line comprises:
   a signal node that includes a first contact, a second contact, and a first via that communicatively couples the first contact and the second contact; and
   a ground node that includes a third contact, a fourth contact, and a second via that communicatively couples the third contact and the fourth contact;
   wherein a first distance between the first contact and the third contact, as measured in a first direction perpendicular to a direction of signal propagation through the waveguide, is based on a desired group index of the transmission line; and wherein a second distance between the second contact and the fourth contact, as measured in the first direction, is based on a desired impedance of the transmission line.

2. The transmission line of claim 1, wherein the first contact and the third contact are to be coupled with a face of a substrate that includes the waveguide.

3. The transmission line of claim 2, wherein the second contact is at least partially positioned over the first contact in a direction perpendicular to the face of the substrate.

4. The transmission line of claim 3, further comprising a heater to tune operating bias of the transmission line, wherein the heater is at least partially positioned between the first contact and the second contact.

5. The transmission line of claim 2, wherein the fourth contact is at least partially positioned over the third contact in the direction perpendicular to the face of the substrate.

6. The transmission line of claim 1, wherein altering the first distance alters the group index of the transmission line to a greater degree than it alters the impedance of the transmission line.

7. The transmission line of claim 1, wherein altering the second distance alters the impedance of the transmission line to a greater degree than it alters the group index of the transmission line.

8. The transmission line of claim 1, wherein the transmission line is a transmission line of a traveling wave modulator or a ring modulator.

9. A method of forming a modulator that includes an electromagnetic transmission line, the method comprising:

depositing a first contact and a third contact on a face of a substrate, wherein the first contact is a first distance away from the third contact as measured in a first direction parallel to the face of the substrate, and wherein the substrate includes a waveguide that is to transmit an electromagnetic signal in a second direction parallel to the face of the substrate and perpendicular to the first direction;

coupling a first via to the first contact and a second via to the third contact, wherein the first via and the second via extend in a third direction perpendicular to the face of the substrate;

coupling a second contact to the first via and a fourth contact to the second via, wherein the second contact is a second distance away from the fourth contact as measured in the first direction;

communicatively coupling the second contact to a signal source; and communicatively coupling the fourth contact to a ground.

10. The method of claim 9, wherein the first distance is based on a desired group index of the transmission line.

11. The method of claim 9, wherein the second distance is based on a desired impedance of the transmission line.

12. The method of claim 9, wherein the substrate is a silicon substrate.

13. The method of claim 9, further comprising positioning a heater between the first via and the second via, wherein the heater at least partially overlaps the first contact and the third contact as measured in the direction perpendicular to the face of the substrate.

14. The method of claim 9, wherein the second contact at least partially overlaps the first contact in the direction perpendicular to the face of the substrate.

15. An electromagnetic modulator that includes:

a substrate with a waveguide; and a transmission line physically coupled with a face of the substrate and electromagnetically coupled with the waveguide, wherein the transmission line includes:

a signal node coupled with a signal source, wherein the signal node includes a first contact coupled with the substrate, a second contact positioned at least partially over the first contact in a direction perpendicular to the face of the substrate, and a first via that couples the first contact to the second contact; and a ground node coupled with a ground, wherein the ground node includes a third contact coupled with the substrate, a fourth contact positioned at least partially over the third contact in the direction perpendicular to the face of the substrate, and a second via that couples the third contact to the fourth contact.

16. The electromagnetic modulator of claim 15, wherein the substrate is a silicon substrate.

17. The electromagnetic modulator of claim 15, wherein the waveguide extends in a first direction parallel to the face of the substrate.

18. The electromagnetic modulator of claim 17, wherein the first contact is a first distance away from the third contact as measured in a second direction parallel to the face of the substrate and perpendicular to the first direction; and wherein the second contact is a second distance away from the fourth contact as measured in the second direction.

19. The electromagnetic modulator of claim 18, wherein the first distance is based on a desired group index of the transmission line.

20. The electromagnetic modulator of claim 18, wherein the second distance is based on a desired impedance of the transmission line.

* * * * *